Patented May 24, 1927.

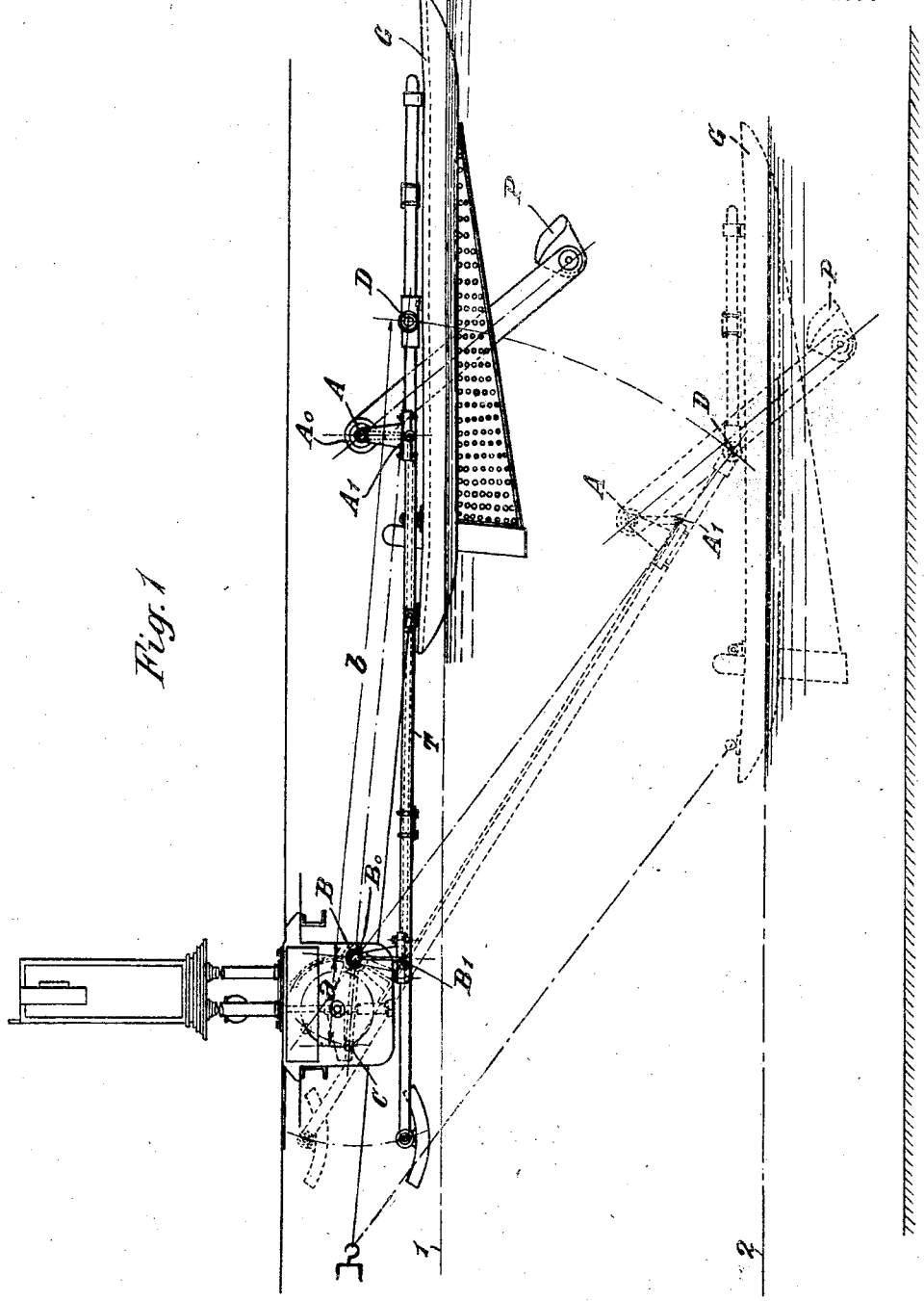

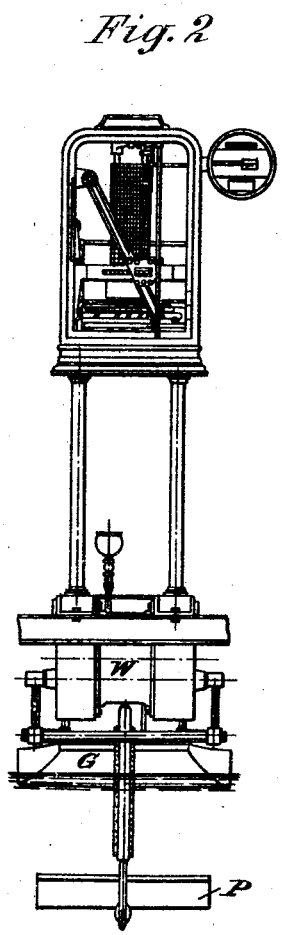
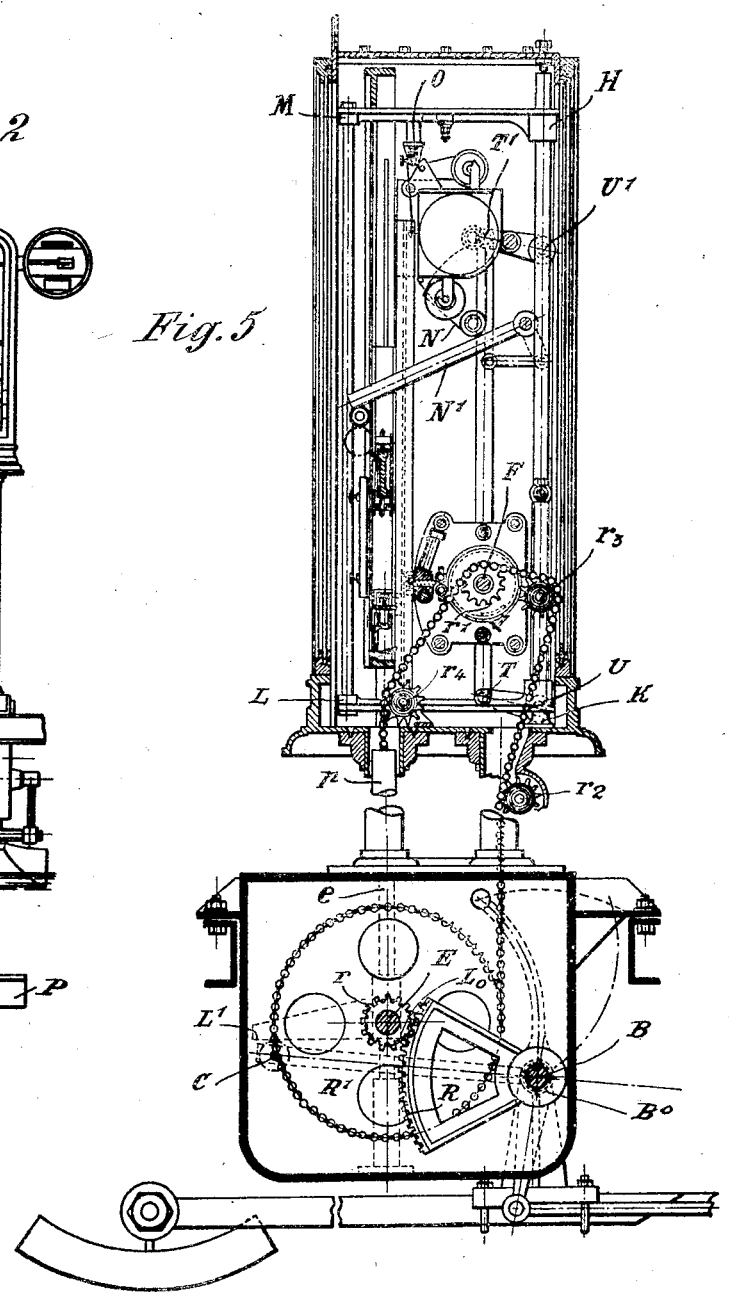

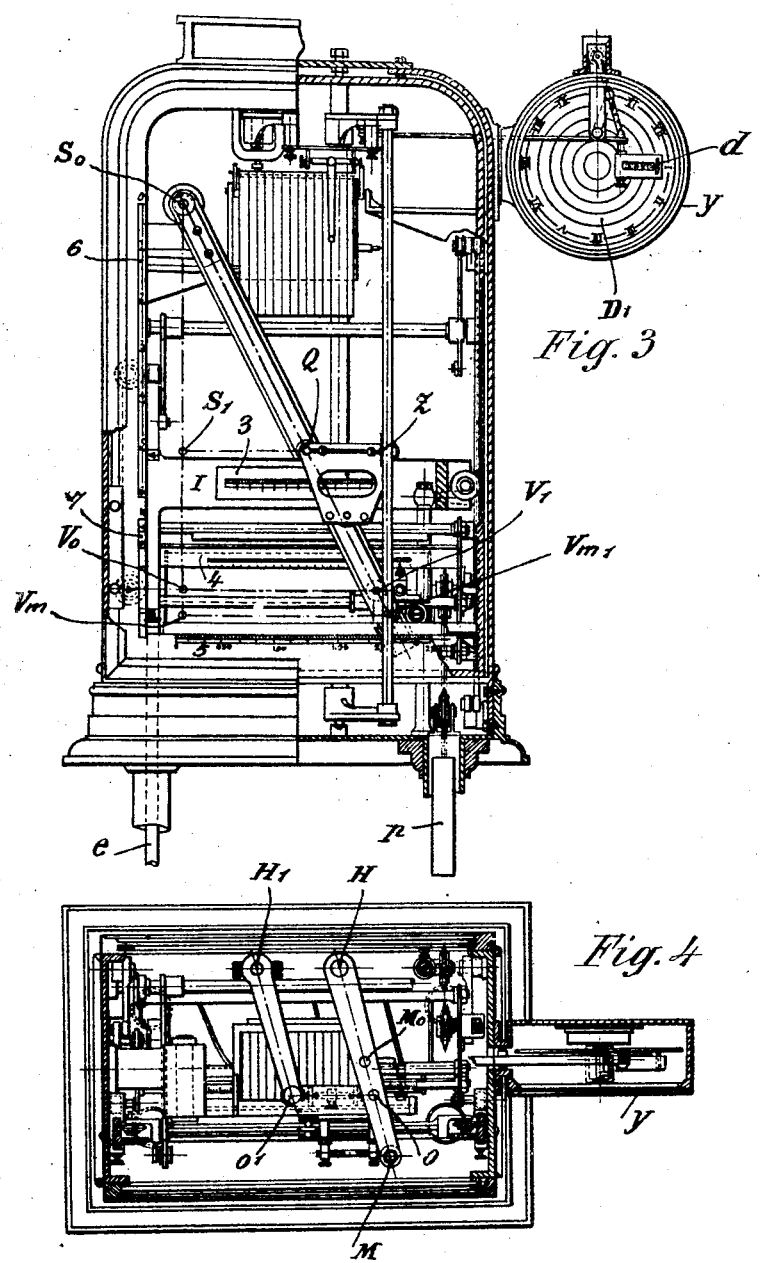

1,630,134

UNITED STATES PATENT OFFICE.

CORRADO PUCCIONI, OF ROME, ITALY.

FLOW INTEGRATOR AND RECORDER.

Application filed December 28, 1923, Serial No. 683,240, and in Italy September 8, 1923.

The present invention relates to a recording apparatus the object of which is the direct indication and registration of the quantity of water per second in open channels, regardless of their conditions of level and speed even if these two elements are changing independently one from the other, the functioning of the apparatus only requiring the regulation of some constants of the apparatus itself in relation to the characteristics of the channel.

This object is attained:

1. Without any loss of pressure head as it takes place with registering apparatus based on the measurement of the height of overflowing water.

2. Without the measurement being influenced by the changing conditions of friction of the water in the channel or by depressions or overflowing of water as it happens with apparatus based on the measurement of level;

3. Without having recourse to any special disposition in the tract of the channel where the apparatus is placed, provided the channel in said tract preserves its section and has no sudden change of direction.

It is well known that the measurement of the quantity of water is important:

1. For fiscal verifications, to verify the quantities of water positively derived;

2. To gather statistics on the available quantities of water to be derived from the channel and on the quantities of water of the river generally to be easily deduced from the quantities of water derived from the channel;

3. For management controls as for instance: verification of the friction conditions of the channel by comparing the levels with the quantities of water; control of manœuvring for the regulation of the quantity of water; in case there is a reservoir feeding the channel or fed by the same, verification of the losses or alterations of the reservoir's capacity by comparing the levels reached in the reservoir with the quantities of water flown into or out of the same.

The apparatus according to the invention deduces the quantity of water of the channel directly from the value —S— of the liquid section from the maximum velocity —$V_p$— and from the proportion K between mean and maximum velocity, quantities, which multiplied with each other give just the quantity of water, the multiplication being executed by the same apparatus.

The apparatus forming the subject matter of the invention, consists in the combination of:

1. A device for measurement of maximum velocity driven by a blade immersed in the current and deviated by the same;

2. A device for measurement of the liquid section —S— of the channel driven by a float. Both devices mentioned are united and are easily applicable to any channel.

3. A recording device of the quantities of water comprising the necessary organs:

(a) To convert the deviation of the blade in a displacement proportioned to the maximum velocity $V_p$;

(b) To convert the preceding displacement in a displacement proportioned to the middle velocity $V_m$ multiplying it with the proportion K (function of the level but in general practically constant for every channel) between minimum and maximum velocity;

(c) To convert the displacement of the float owing to variations of level in a displacement proportioned to the liquid section S of the channel;

(d) To multiply the displacements (b) and (c) with each other and obtain a resulting displacement proportioned to the quantity of water.

(e) To render registrable the preceding displacement conveniently reduced on a fixed clock-work roller;

(f) To control the following integrator.

4. Integrating device or integrator with a planimetric wheel to measure the surface of the diagram of the quantity of water and then the total out-flowing volumes indicated by an integrator designed for this purpose.

The invention is illustrated in the accompanying drawings in which:

Figure 1 is a side elevation of the recording and operating apparatus mounted on a frame.

Fig. 2 is a front elevation of the device illustrated in Fig. 1.

Fig. 3 is a front elevation partly in section of the recording apparatus.

Fig. 4 is a top view partly in section of the recording apparatus shown in Fig. 3.

Fig. 5 is a side view partly in section of the recording apparatus shown in Fig. 3 together with a portion of the device for operating the apparatus.

*Device for measurement of maximum velocity.*

The measurement of maximum velocities —$V_p$— is obtained by means of the deviation of a blade P (Figs. 1 and 2 of the accompanying drawings) of special shape immersed in the water where the current has the maximum velocity and borne by a hollow iron rod rotatable around an axle A forming together a species of pendulum tending to be carried back to the position of rest by the action of its own weight or eventually in special cases by an antagonistic spring or a lever with a counterweight.

The shape of the blade is designed in such a way as to obtain for each inclination the best possible adhesion of the liquid vein with the object of avoiding the formation of any whirling, by which the deviation would become unstable, moreover to cause the pendulum to acquire a sensitiveness approximately uniform at the different velocities.

In fact the stress to which the blade is exposed varies approximately in proportion to the square of the velocity and projection of the blade on a plane perpendicular to the direction of the current. But when the velocity is increasing, as the deviation of the blade also augments, said projection will diminish and the arm of the couple by which the stress produced by the impact of the water acts on the pendulum also diminishes. These two facts united already tend to correct the quadratic law of the increase of the stress according to velocities and consequently the deviation of the blade approximately obeys a law proportional to the velocity. This approximation is caused to increase by the shape of the blade the fore surface of which roughly consists of two planes connected by a curved surface, one of which is in the position at rest of the blade perpendicular to the current, the other already possessing an initial inclination, so that its projection when the deviations are the greatest approaches zero.

The blade is then rotatable around the suspension rod, this allowing to increase or diminish such effect according to the desire to have a sensitiveness at the highest velocities.

The axle A is movable up or down according to level variations, the axle being borne by a frame T made of an iron pipe rotating around the horizontal axle B controlled by a float G hinge-jointed to the extremity D of the frame. The position of the axle A on the movable frame is fixed in such a way as to keep a convenient immersion of the blade in any condition whatever of the level of the channel.

The immersion is regulated in such a manner that the blade is always pushed by the stream of water of greatest velocity, because in such conditions the proportion between middle velocity and the velocity striking the blade is constant for the greater part of channels; in any case the proportion is settled according to each level as it will be proved further on.

The deviation of the blade P (Figs. 1 and 2) for measuring the maximum velocity is transmitted from the sleeve $A_0$ (forming the pendulum hub) rotatable on the suspension axle A, to the sleeve $B_0$ by means of a parallelogram $A A_1$ and $B_0 B_1$ consisting of two equal levers $A A_1$ and $B_0 B_1$ connected by a rod $B_1 A_1$ the length of which is equal to the distance $B_0 A$.

The sleeve $B_0$ (Fig. 5) rotates by means of ball bearings on concentric axle B rigidly connected with the frame T to which the float is united.

It is evident that whatever may be the position of the suspension rod A, according to the water level $A_0 A_1$ will always be parallel to $B_0 B_1$, consequently the variations of the deviation angle of the blade will always be transformed in exactly equal rotations of the sleeve $B_0$. On the sleeve $B_0$ is mounted a toothed-sector R (Fig. 5) engaging a pinion —$r$—. The ratio of the two gears is 6 to 1. Therefore the maximum deviation of the blade allowed being about 45°, the maximum rotation of a pinion —$r$— is about $45° \times 6 = 270°$. On the same axle E of the pinion is mounted, a rotatable oil brake composed of a turning fan in a cylindrical chest W (Fig. 2) filled with oil and provided with a radial diaphragm. The resistance opposed by the oil in passing through the clearance space left by the fan, from one to the other chamber formed by the fan in the chest, softens the oscillations of the blade produced by the instantaneous variations of the velocity of the water striking the blade, variations especially caused by the highest velocities owing to a winding stream and to wavy movements. A connecting pipe between the chambers being provided with a cock allowing the braking action to be regulated. Moreover the hub of the fan is provided with a recess on a sector of its periphery through which the oil drops when the deviations of the blade are small, so that in this case the braking action is suppressed, which is necessary to keep the sensitiveness required even in the case of low velocities, that is when the stress being smaller the indications of the brake could not be correct, while the braking action would not be required there being no longer oscillations to be damped.

From the axle E (Figure 5) the movements are transmitted to the axle F by means of a chain drive with a further multiplication in general in the proportion of 6, consequently in totality the deviation of the blade is multiplied on axle F in the proportion of 6×6=36. One of the extremities of the chain is fixed to a point of the periphery of the larger wheel R', the other extremity bearing a counterweight stretching the chain and allowing thus the transmission of movement to the smaller wheel —$r_1$— mounted on axle F the chain passing over said wheel after passing over intermediate loose pulleys —$r_2$— and —$r_3$—.

On axle F (Figs. 3 and 5) is mounted a cylinder on which a wire coil is wound the ordinates of which referred to a determined circumference, taken as a base, represent the velocities —$v_p$— corresponding to each single deviation in a convenient scale.

A slider $V_1$ movable in a plane parallel to the axle of the cylinder is controlled by said coil, the displacements of the slider measuring the velocity $V_p$ in the fixed scale. These displacements can be read in a proper scale 4 (Fig. 3) of the maximum velocities.

The arrangement mentioned to reduce the deviation of the blade in a horizontal displacement proportioned to the velocity $V_p$ easily allows the correction of this reduction when the apparatus is already installed, in case the correction is not right. In fact the copper coil may be adjusted on the cylinder in various ways, for instance, by fixing and by the friction obtained by stretching the wire between small end supports and by means of nuts screwed at the threaded extremities of the wire.

(2) *Device for measuring the liquid section.*

The liquid section as above mentioned is measured by means of a flat-shaped float G, directly immersed in the channel and hinge-connected at D with frame T, rotatable around the fixed axle B (Fig. 1). The float consists of two flat halves of galvanized sheet iron reinforced by an internal frame of wood.

The float besides causing as mentioned, variations in the position of the suspension shaft A of the blade according to the water level and allowing the measurement of the level and liquid section has for its object to prevent floating bodies as twigs, branchlets, leaves, etc. from being deposited on the blade the deviation of which might be consequently changed. The float has been provided on the fore part with a protection suspended thereon, and for the channels entraining many leaves a protecting casing of thin plate with holes is provided in which the blade's rod can move. The protection rod is rotatable around a fulcrum so that it is possible to extract it easily when cleaning is necessary.

Opposite the frame B D there is a counter-lever BC, acting on a cylindrical surface with generatrixes parallel to the axle B, the surface being guided vertically and controlling a truck I the displacements of which measure the liquid sections on a proper scale 6 (Fig. 3).

Should the banks of the canal be vertical, the liquid sections will vary proportionately according to the level. Supposing then the surface L L' is a horizontal plane the vertical displacement of such surface will measure the liquid sections in the required scale Z chosen to represent 1 square meter of liquid section when:

$$\frac{z}{\frac{1}{L}}=\frac{a}{b}$$

where $a$=BC—L=width of the canal, then $\frac{1}{L}$=variation of level corresponding to the variation of 1 square meter of the liquid section. The value can be consequently deduced when the value of $b$ is fixed and vice versa.

Should the canal have inclined or curved banks, the surface L L ought to have then a proper curved generatrix to be easily determined in relation to the inclination and shape of the banks.

(3) *Recording device.*

The top part of the apparatus illustrated in Figs. 3 (side view), 4 (plan view) and 5 (section) constitutes the recording device. In that part there are sliding the truck I and the runner $V_1$ already above mentioned, the displacements of which measure respectively in proportionate scale the surface of the liquid section and the maximum velocity $V_p$.

The runner $V_1$ drives a straight link $S_o V_o$ rotatable around $S_o$ the driving being effected by means of a trolley wheel borne by the runner and sliding in the straight link, which on its turn controls two small trucks, the one $V_m$, sliding in a horizontal guide placed at a fixed distance from $S_o$ (in practice $S_o V_m$= 500 mm.), the displacements of which measure (in a scale 1.25 times greater than the $V_p$ scale) the middle velocity $V_m$ (this is obtained by causing $S_o V_o$ to be such that $$S_o V_m = 1.25 \times S_o V_o \times K$$

where $$K=\frac{V_m}{vv}; \text{ then } S_o V_o=\frac{S_o V_m}{1.25K}=\frac{400}{K});$$

the other small truck QZ horizontally sliding in the truck of the liquid sections measures by its displacements the quantities of water (in fact $$SQ = \frac{V_m V_{m1} \times S_o S}{S_o V_m} = \frac{V_m S}{500} \text{ in the scale} = \frac{W \times Z}{500}$$

where W and Z are the scales chosen for the middle velocity and liquid section).

If K results constant practically as it is the usual case it will be sufficient to regulate the distance $S_o V_o$ to a constant value according to the value of K; but on the contrary if K varies according to the level the distance $S_o V_o$ will have to be conveniently varied, which is obtained as follows:

The registration of the quantity of water on a proper clock-work roller is obtained by causing the writing stylus to reproduce the displacements of the truck QZ reduced however in a fixed proportioned $r$, so that the registration results in a smaller scale requiring thus a recording roller of a smaller height.

The transmission of the movement to the stylus is effected by means of a rectangular frame HKLM rotatable around the axle HK by means of a buffer Z of the truck QZ, the side LM of the frame bearing on the buffer, said side consisting of a small cylindrical rod, a spring conveniently operating on axle HK.

The axle HK is on the middle line of the maximum displacement of Z so that the end positions of the frame corresponding to P=O and P=maximum result symmetric.

The projection of the arc of the circle accomplished by M parallel to the front of the apparatus and consequently to the displacement of truck QZ evidently results equal to the displacement of the same truck. The displacement of the stylus however measures such projection reduced in the ratio $r$, the stylus being united to a small connecting rod OO' joining two points O—O' of the two parallel levers HM and H'M' such as HO=H'O'=HM $x$ $r$. In such a way the reduction mentioned at the ratio $r$ is obtained.

The stylus owing to said arrangement is always held parallel to itself. According however to the position of frame HKLM the stylus would approach the recording roller or run a great distance from the same. To remedy this the stylus is articulated and kept adherent to the roller by a small spring. This arrangement only alters very lightly the hour registered by the stylus in some positions of the frame HKLM, but in a quite discernible way. The alteration may be rendered the least possible by causing the point of contact of the stylus on the roller to lie on the middle line on the maximum cross displacement of the fulcrum of the stylus and choosing for the stylus a suspension rod sufficiently long.

*Arrangement when K is variable.*

In general the ratio K for a determined channel when $V_p$ is the velocity of the streamlet of a maximum velocity results, for walled channels as generally the channels or industrial installations are, practically constant, even when the water level is remarkably variable.

In fact the ratio is given according to Bazin by the formula:

$$K = \frac{\text{middle V}}{\text{maximum V}} = \frac{1}{1 + 14\sqrt{A + B/R}}$$

where A and B are coefficient depending on the nature of the banks' surface and consequently constant for a determinate channel, R being the middle radius. In fact for the 5 types of channels mentioned by Bazin the following values for A and B are obtained:

I Channels with very smooth walls _____ A=150×10⁶; B=4, 5×10⁶
II Channels with smooth walls _____ A=190×10⁶; B=13, 3×10⁶
III Channels with slightly rough walls ____ A=240×10⁶; B=60×10⁶
IV Earth channels _____ A=280×10⁶; B=350×10⁶
V Channels and rivers with gravel _____ A=400×10⁶; B=700×10⁶

On the base of such values for A and B the following values correspond to the different middle radiuses:

*Values of K.*

*Middle radius R.*

| Type of the channel | 0,40 | 0,50 | 0,60 | 0,80 | 1,00 | 2,00 | 3,00 | 6,00 |
|---|---|---|---|---|---|---|---|---|
| I | 0,85 | 0,85 | 0,85 | 0,85 | 0,85 | 0,05 | 0,85 | 0,85 |
| II | 0,83 | 0,83 | 0,83 | 0,83 | 0,83 | 0,84 | 0,84 | 0,83 |
| III | 0,78 | 0,79 | 0,80 | 0,80 | 0,81 | 0,81 | 0,82 | 0,83 |
| IV | 0,68 | 0,70 | 0,71 | 0,72 | 0,74 | 0,77 | 0,78 | 0,80 |
| V | 0,61 | 0,62 | 0,64 | 0,66 | 0,68 | 0,72 | 0,74 | 0,76 |

From this chart it is seen that for walled channels with a middle radius above 0,40 the ratio K does not generally vary beyond 1% (exceptionally 2% for small channels of III type), variations of the middle radius even from 1 to 2 variations being included, corresponding to level variations even at a higher ratio, because the middle radius as it might be easily proved always varies more slowly than the level. This variation of K is then not worth considering it being included between the limits of the unavoidable errors of the apparatus and it is sufficient to regulate the distance $S_o V_o$ on the base of a fixed invariable value in relation to the characteristic value of the ratio K for the channel where the apparatus is placed.

To render however the apparatus also applicable in the case the ratio K cannot be considered as constant, the channels being of earth or gravel or covered channels in which the level and consequently the middle radius vary to a great extent, the apparatus is provided with a device allowing to take into account even an eventual variation of K according to the level.

To this purpose it is evidently sufficient to cause the distance $S_0V_0$ to vary according to the level. This has been attained as above mentioned by a system NN' of levers and cams conveniently shaped driven by the truck of the liquid section I by which system the roller with the screw is operated up and down, the $V_p$ scale varying consequently the distance $S_0V_0$ according to the level.

It is however necessary that notwithstanding such displacement the rotation of the registering roller be not altered so that to a determined variation of the blade always corresponds the same rotation of the roller with the screw and then the same position of the runner $V_1$ driven by the roller. To this effect the driving chain passes on an auxiliary pulley $r_3$ (Fig. 5) before passing on the pulley $r_1$ of the roller, the position of the axle of pulley $r_3$ being regulated as follows:

It is to be premised that the whole bulk of the roller with the screw the guide of the runner $V_1$ comprised is borne by the vertical connecting rods of two equal parallelograms T'T'UU' and $T_0T_0'$ $U_0$ and $U_0'$ placed on both sides of the apparatus of which only the first is shown in Fig. 5. To secure that the deformation of both parallelograms is absolutely identical the corresponding upper levers are rigidly connected by a cross bar. The whole bulk of the roller may run on said connecting rods and be fixed at a height whatever according to the value of K. The driving pulley of roller $r_1$ has its axle lying in the vertical plane determined by the axles of the two connecting rods while the pulley $r_3$ has an axle sliding on proper guides in the vertical plane determined by the straight lines joining the centers U U'—$U_0U_0'$.

Consequently if the position of pulley $r_3$ is regulated in such a way that its center lies on the parallel to the axles of cranks TU—$T_0U_0'$ passing the center of pulley $r^1$, this center will describe around the center of $r_2$ a circle of a radius equal to the length of the cranks of the parallelograms. Consequently the two pulleys being identical and joined by a chain and their distance being invariable, the pulley $r_1$ will not rotate whatever may be the deformation of the parallelograms till $r_3$ rotates of the same angle in the case of rotation securing thus the perfect transmission of the rotation of the blade whatever may be the position of the parallelograms.

As the entire roller is always shifted in a direction parallel its axis owing to both the parallelograms so no rotation of the guide of the runner with respect to the roller will take place and consequently not even the transmission to the runner $V_1$ will be influenced by the variation of the position of the parallelograms according to the regulation of the distance $S_0V_0$ in reference to the value of K.

(4) *Integrating device.*

An integrating device is joined to the apparatus allowing to obtain the cubic meters of water flowing in a determined time.

A device is contained in a cylindrical chest Y laterally connected to the apparatus by means of a supporting arm.

Through this arm there passes a small connecting rod guided at one end on a straight line parallel to the displacement of QZ, at the other end controlled by a pivot $M_0$ placed in the center of the lever HM. To the end guided on a straight line there is a normal registering device of the roller type adopted in the electricity meters. This registering device is driven by a planimetric wheel driven by a disc through friction contained in said cylindrical chest, the disc rotating by means of a clock-work. The displacements of the connecting rod's end guided on a straight line evidently result equally to the half of the displacements of Q and consequently in proportion to the quantities of water.

The revolutions of the planimetric roller will be in proportion to the displacement of it from the center of the disc (this displacement being proportioned to the quantity of water) and in proportion to the number of revolutions that is to the time. They will consequently measure the total volumes flown.

What I claim is:

1. An improved apparatus for indicating the flow of water in channels comprising a fixed frame-work, a float connected with the frame-work, a blade mechanically connected with the float in such manner that the position of the float substantially controls the depth of the immersion of the blade, said blade being adapted to receive deviations corresponding to the speed of the water striking, calculating devices associated with the blade and float, and means for transmitting deviations of the blade and the movements of the float to the calculating devices, said calculating devices being designed to allow for the known shape of the channel and functioning to automatically indicate the quantity of water flowing in the channel.

2. An improved apparatus for indicating the flow of water in channels, comprising a fixed framework, a float connected by a rotatable arm to the framework, a blade mechanically connected to said rotatable arm in such a manner, that the position of the float substantially controls the depth of the immersion of the blade, said blade being adapted to every level at the point of maximum speed, and to receive deviations corresponding to the speed of the water striking, calculating device associated with the blade and float, and means for transmitting said deviations of said blade correspondingly to the different speeds and the movements of the float correspondingly to the different levels and consequently to the different liquid sections, said calculating device being designed to allow for the known section of the channel and functioning to indicate and record the product of maximum speed multiplied with ratio K and with liquid section, ratio $$K = \frac{\text{middle speed}}{\text{maximum speed}}$$

being a known function of the level for each channel, this product indicating the quantity of water flowing in the channel.

3. An apparatus as claimed in claim 1 including a rod upon which the blade is mounted, and means for setting the blade at different angles relatively to said rod, for the purpose of varying the range of greatest sensitiveness.

4. An apparatus as claimed in claim 1 in which the means for transmitting the deviation of the blade to said calculating devices includes means whereby the deviation of the blade is transmitted into a displacement proportional to the velocity of the water by means of a cam consisting of a coil wound tightly upon the roller, whereby the form of the cam may be readily changed when desired.

5. An apparatus as claimed in claim 1 including a frame pivotally connected to said fixed framework and to said float, said blade being mounted upon said frame.

6. An apparatus as claimed in claim 1 in which the deviation of the blade is transmitted to a parallelogram system of rods, so that this transmission will be independent of the position of the float.

In testimony whereof I have hereunto signed my name.

CORRADO PUCCIONI.